United States Patent
Chen et al.

(10) Patent No.: US 10,642,887 B2
(45) Date of Patent: May 5, 2020

(54) MULTI-MODAL IMAGE RANKING USING NEURAL NETWORKS

(71) Applicant: ADOBE INC., San Jose, CA (US)

(72) Inventors: Kan Chen, Los Angeles, CA (US);
Zhaowen Wang, San Jose, CA (US);
Trung Huu Bui, San Jose, CA (US);
Chen Fang, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 262 days.

(21) Appl. No.: 15/391,285

(22) Filed: Dec. 27, 2016

(65) Prior Publication Data
US 2018/0181592 A1  Jun. 28, 2018

(51) Int. Cl.
*G06F 16/53*  (2019.01)
*G06F 16/58*  (2019.01)
*G06F 16/583*  (2019.01)
*G06N 3/04*  (2006.01)
*G06N 3/08*  (2006.01)

(52) U.S. Cl.
CPC ...... *G06F 16/5846* (2019.01); *G06F 16/5838* (2019.01); *G06F 16/5866* (2019.01); *G06N 3/0454* (2013.01); *G06N 3/08* (2013.01)

(58) Field of Classification Search
USPC .............................................. 707/748, 767
See application file for complete search history.

(56) References Cited

U.S. PATENT DOCUMENTS

| | | | | |
|---|---|---|---|---|
| 2010/0205202 A1* | 8/2010 | Yang | ..................... | G06F 16/532 707/767 |
| 2012/0254076 A1* | 10/2012 | Yang | ..................... | G06F 16/54 706/12 |
| 2014/0250120 A1* | 9/2014 | Mei | ..................... | G06F 3/0488 707/736 |
| 2015/0178186 A1* | 6/2015 | Wang | ..................... | G06F 12/023 711/159 |
| 2016/0379132 A1* | 12/2016 | Jin | ..................... | G06N 99/005 706/12 |

(Continued)

OTHER PUBLICATIONS

Frome, A., Corrado, G. S., Shlens, J., Bengio, S., Dean, J., & Mikolov, T. (2013). Devise: A deep visual-semantic embedding model. In Advances in neural information processing systems (pp. 2121-2129).

(Continued)

*Primary Examiner* — Hung T Vy
(74) *Attorney, Agent, or Firm* — Shook, Hardy & Bacon, L.L.P.

(57) ABSTRACT

Methods and systems are provided for ranking images against queries. A visual modality ranking of visual features of a digital image against a query is generated. A language modality ranking of text features of text associated with the digital image against the query is also generated. A multi-modal neural network determines importance weightings of the language modality ranking and the visual modality ranking against the query. The visual modality ranking and the language modality ranking are combined into a multi-modal ranking of the digital image against the query based on the importance weightings. The digital image is provided as a search result of the query based on the multi-modal ranking.

20 Claims, 8 Drawing Sheets

(56) References Cited

U.S. PATENT DOCUMENTS

2017/0061250 A1* 3/2017 Gao ................ G06F 16/3347
2017/0083623 A1* 3/2017 Habibian ........... G06K 9/00664

OTHER PUBLICATIONS

He, K., Zhang, X., Ren, S., & Sun, J. (2016). Deep residual learning for image recognition. In Proceedings of the IEEE conference on computer vision and pattern recognition (pp. 770-778).

Huang, P. S., He, X., Gao, J., Deng, L., Acero, A., & Heck, L. (Oct. 2013). Learning deep structured semantic models for web search using clickthrough data. In Proceedings of the 22nd ACM international conference on Conference on information & knowledge management (pp. 2333-2338). ACM.

Yao, T., Mei, T., & Ngo, C. W. (2015). Learning query and image similarities with ranking canonical correlation analysis. In Proceedings of the IEEE International Conference on Computer Vision (pp. 28-36).

\* cited by examiner

MULTI-MODAL IMAGE RANKING USING NEURAL NETWORKS

BACKGROUND

Image searching applications, such as Adobe® Stock, rank images against queries, which may be natural language queries provided by users. Neural networks have been used to determine the similarities between queries and images. However, these approaches classify an overall image and therefore often overlook specific regions of the image which may be relevant to a query. Further, these approaches fail to account for the potentially rich metadata available for images, such as captions (e.g., titles), tags, keywords, descriptions, and the like. Neural networks have been used for web searches to map queries to the text of web documents at the semantic level. However, these approaches do not account for images or metadata of images that might be contained in those web documents.

Using conventional approaches to determining similarities between queries and images, a computer may be unable to accurately determine the relevance of certain images to a query. For example, where a query is "The golden gate bridge in San Francisco," highly ranked images may include clear and sharp photos of San Francisco. However, other relevant images may be ranked low despite depicting the subject matter of the query. For example, conventional neural networks may have difficulty recognizing images that contain visual distortion, such as blur, as well as artistic renditions of the subject matter. Additionally, where the subject matter corresponds to a small portion of the image, it may be overlooked using conventional approaches.

SUMMARY

Aspects of the present disclosure provide for a ranking network which uses multiple modalities of evaluating similarities between queries and images in order to rank the images against the queries. At least one modality is based on similarities between queries and visual features of images. At least another modality is based on similarities between queries and textual features of the images, such as text from descriptions, captions, keywords and/or tags associated with an image (e.g., image metadata), and even text from within the image (e.g., extracted using optical character recognition). A multi-modal neural network is used to determine the relative importance of each particular modality in ranking a given image with respect to a query.

In some respects, the multi-modal neural network receives the query and at least one ranking of an image against the query for each modality and determines an importance weighting for each modality. The rankings from the modalities are reweighted by their corresponding importance weighting and combined to form a multi-modal ranking of the image. Thus, the ranking network can, for example, determine the relative importance of visual features of an image and textual features of the image for a given query. Using this approach, the ranking network may, for example, rely more heavily on textual features when the visual features are unreliable. As another example, the ranking network may rely more heavily on visual features for more descriptive and detailed queries. Thus, the ranking network can provide more accurate and reliable image rankings.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Typical approaches to ranking images against queries using a neural network fail to account for the potentially rich metadata available for images, such as captions (e.g., titles), tags, keywords, descriptions, and the like. Aspects of the present disclosure provide for a ranking network which may not only evaluate the importance of visual features of an image with respect to a query, but also the importance of textual features of the image, such as image metadata, with respect to the query. Further, the ranking network may weigh the importance of visual features of the image with respect to the query differently from the importance of textual features of the image when ranking the image.

In some aspects of the present disclosure, in ranking an image, the ranking network analyzes and ranks visual features of the image separately from textual, or language features of the image. As used herein, each independent algorithm for ranking and analyzing an image with respect to a query is referred to as a modality. A visual modality refers to an algorithm for ranking and analyzing at least visual features of an image with respect to a query and outputs at least one visual modality ranking of the image. A text of language modality refers to an algorithm for ranking and analyzing at least text features of an image with respect to a query and outputs at least one language modality ranking of the image. The ranking network combines rankings from each modality to form a multi-modal ranking of an image against a query.

In some implementations, the ranking network provides to a multi-modal neural network the query and at least one ranking of the image against the query from each modality. The multi-modal neural network uses this information to determine an importance weighting for each modality. The ranking network reweighs the rankings from the modalities by their corresponding importance weighting and combines the reweighted rankings to form a multi-modal ranking of the image.

Using this approach, the ranking network can determine the relative importance of visual features of an image and textual features of the image for a given query. Thus, the ranking network may, for example, rely more heavily on textual features of an image when the visual features are distorted. For instance, when a visual feature is blurred or distorted beyond a threshold value, a ranking network may allocate a weight of 0.6 on a textual feature of an image and a weight of 0.4 on visual feature of the image, as one example. As another example, the ranking network may rely more heavily on visual features for more descriptive and detailed queries. Thus, the ranking network can provide more accurate and reliable image rankings.

In further respects, a visual modality may comprise at least one neural network which evaluates an image against a query to determine a visual modality ranking. The at least one neural network can comprise an intra-attention neural network which determines the relative importance of particular regions of the image against the query (e.g., an importance score for each region). Thus, the ranking network can identify similarities between the image and query which would be overlooked by conventional approaches. For example, a query for "brown shoes" may focus on regions of the image depicting brown shoes, whereas a query for "black hat" may focus on regions of the image depicting a black hat. A conventional approach may in contrast classify the image at the high level of "evening wear" or "formal attire," which would overlook highly relevant visual features for many queries.

In some embodiments, a language modality may comprise at least one neural network which evaluates textual features of an image against a query to determine a language modality ranking. The at least one neural network can comprise an intra-attention neural network which determines the relative importance of particular words corresponding to the image against the query (e.g., an importance score for each word). As mentioned above, the words can be from image metadata, such as captions and/or keywords assigned to the image. Using this approach, the intra-attention neural network may rank some words higher for one query than for another query for the same image. However, the overall ranking of the image could still be similar for each query. For example, a search for "Golden Gate Bridge" could focus on "Bridge" and "Landmark," whereas a search for "Ocean Sunset" could focus on "Sea," "Dawn," and "Sun" for the same image.

In some embodiments, separate language modalities are used for captions of image and keywords of images. A caption modality refers to a language modality which evaluates a caption, such as a title, of an image. A keyword modality refers to a language modality which evaluates keywords, such as keyword tags, of an image. Captions of images may describe the images in a different manner than keywords. By using separate modalities, the ranking network can capture these differences in evaluating the images against queries, which can improve the accuracy of image rank rankings. For example, captions often use natural language and sentences, which contain different words (e.g., conjunctions, articles, and prepositions are typically not used as keywords) and capture different semantic information than keywords.

In further aspects of the present disclosure, a network trainer can jointly train neural networks of each modality along with the multi-modal neural network. Using this approach, the ranking network can learn to evaluate the complex relationships between visual features (e.g., individual image regions) and textual features (e.g., individual words) of images as they relate to the relevance of images to queries.

In some cases, the network trainer automatically determines positive samples and/or negative samples for training the ranking network based on analyzing user interactions with images in association with queries. For example, based on a user clicking on or otherwise explicitly interacting with a digital image of a search result of a query, the network trainer can use this digital image and its associated image metadata as a positive sample for training the ranking network. As another example, based on the user not clicking on or otherwise explicitly interacting with a digital image of a search result of the query, the network trainer can use the digital image and its associated image metadata as a negative sample for training the ranking network. This approach can be used to avoid extensive manual labeling and curation of training samples, while providing highly reliable training data. Further, this approach may be used to train a ranking network based on user feedback on search results generated using the ranking network.

Figure 1:
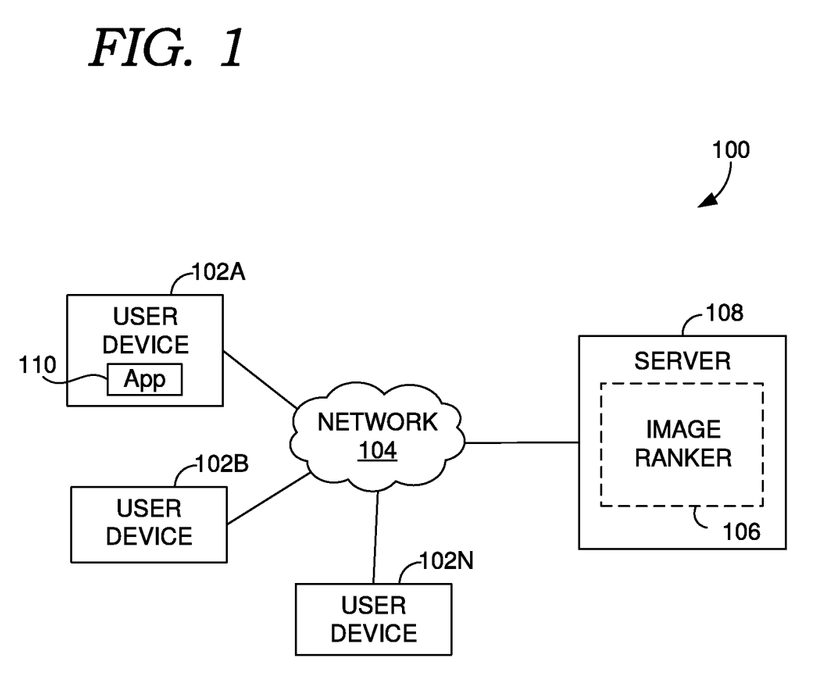
FIG. 1 is a block diagram showing an example of an operating environment, in accordance with embodiments of the present disclosure.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102A and 102B through 102N, network 104, and server(s) 108.

It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102A through 102N comprise any type of computing device capable of being operated by a user. For example, in some implementations, user devices 102A through 102N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image ranking. In some implementations, the application(s) comprises a web application, which can run in a web browser, and could be hosted at least partially on the server-side of operating environment 100. In addition, or instead, the application(s) can comprise a dedicated application, such as an application having image and query processing functionality. In some cases, the application is integrated into the operating system (e.g., as a service). It is therefore contemplated herein that "application" be interpreted broadly.

Server 108 also includes one or more processors, and one or more computer-readable media. The computer-readable media includes computer-readable instructions executable by the one or more processors. The instructions may optionally implement one or more components of image ranker 106, described in additional detail below.

Image ranker 106 can train and operate an image ranking system in order to rank images against lingual text. Although the present application describes the lingual text as being queries, it should be appreciated that in various implementations, any form of lingual text may be employed, such as that from books, sentences, forums, instant messages, emails, and the like. In various implementations, the lingual text is provided in the form of natural language text. For example, where queries are employed, the queries may be natural language queries.

In various implementations, after the image ranking system is trained, a user may provide a query to image ranker 106, such as via user input to application 110, which may comprise a search bar or other search interface to receive the query from the user. Image ranker 106 evaluates a set of images against the received query using the image ranking system to generate rankings for the set of images. Image ranker 106 may further provide (e.g., transmit) at least some of the ranked images and/or rankings for the images for presentation or display on the user device, such as in application 110 as search results to the query.

Figure 2:
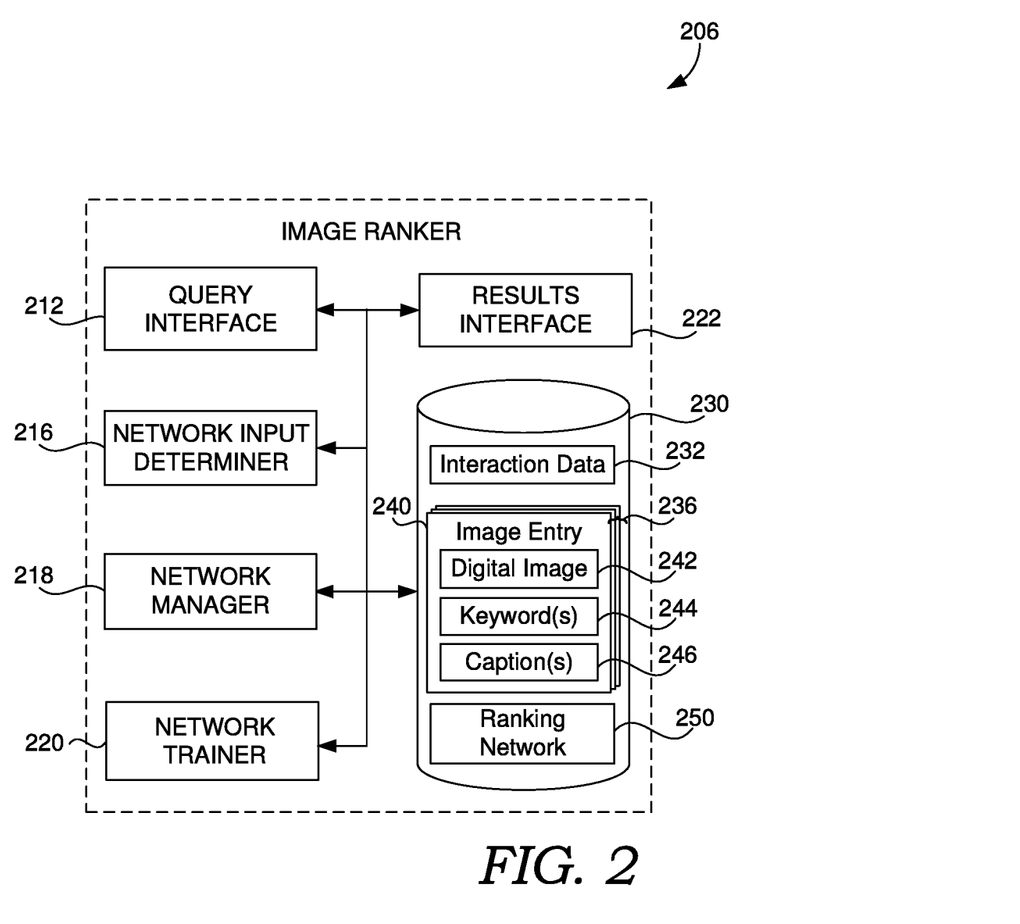
FIG. 2 shows a block diagram of an image ranker, in accordance with embodiments of the present disclosure.

Referring to FIG. 2, a block diagram of an image ranker is shown, in accordance with embodiments of the present disclosure. Image ranker 206, which can correspond to image ranker 106, includes query interface 212, network input determiner 216, network manager 218, network trainer 220, results interface 222, and storage 230.

The foregoing components of image ranker 206 can be implemented, for example, in operating environment 100 of FIG. 1. In particular, those components may be integrated into any suitable combination of user devices 102A and 102B through 102N, and server(s) 108. For cloud-based implementations, the instructions on server 108 may implement one or more components of image ranker 206, and application 110 may be utilized by a user to interface with the functionality implemented on server(s) 108. As mentioned above, in some cases, application 110 comprises a web browser. In other cases, server 108 may not be required. For example, the components of image ranker 206 may be implemented completely on a user device, such as user device 102A. In this case, image ranker 206 may be embodied at least partially by the instructions corresponding to application 110.

Thus, it should be appreciated that image ranker 206 may be provided via multiple devices arranged in a distributed environment that collectively provide the functionality described herein. Additionally, other components not shown may also be included within the distributed environment. In addition, or instead, image ranker 206 can be integrated, at least partially, into a user device, such as user device 102A. Furthermore, image ranker 206 may at least partially be embodied as a cloud computing service.

Storage 230 can comprise computer-readable media and is configured to store computer instructions (e.g., software program instructions, routines, or services), data, and/or models used in embodiments described herein. In some implementations, storage 230 stores information or data received via the various components of image ranker 206 and provides the various components with access to that information or data, as needed. In implementations, storage 230 comprises a data store (or computer data storage). Although depicted as a single component, storage 230 may be embodied as one or more data stores and may be in the cloud. Further, the information in storage 230 may be distributed in any suitable manner across one or more data stores for storage (which may be hosted externally).

Among other potential information, storage 230 includes, as examples, interaction data 232, image entries 236, and ranking network 250. Each of image entries 236 corresponds to a respective digital image. Also, each image entry can further include at least one of a set of keywords assigned to the digital image and a set of captions assigned to the digital image. As used herein, a set contains one or more items. Further, where the term set is used, the associated system may or may not be configured to accommodate multiple items in the set. As an example of one of image entries 236, image entry 240 of digital image 242 includes keywords 244 and caption 246.

Keywords 244 and caption 246 may more generally be considered lingual text metadata, which can be descriptive of digital image 242. In some implementations, image ranker 206 provides a user interface a user can use to assign the set of keywords and/or captions to the digital image. For example, the user may type in and/or select the keywords and captions for the digital image. In some cases, a user assigns the set of keywords and the caption to the digital image while providing the digital image for upload to image ranker 206 (e.g., via application 110). Image ranker 206 creates a corresponding image entry in storage 230 using the user provided digital image and/or image information or metadata.

Assume, as an example, digital image 242 comprises a photograph of the Golden Gate Bridge in San Francisco, Calif. Suitable keywords 244 may include "golden gate," "bridge," "landmark," "travel," "california," "transportation," "ocean," "clouds," "francisco," "dusk," "red," "suspension," "evening," and "historical." A suitable caption 246 for digital image 242 could be "Golden Gate Bridge in San Francisco at sunset." A caption may refer to a sentence or natural language grouping of words used to explain what is being shown in the digital image. Image ranker 206 can be configured to present or cause to be presented the caption alongside, next to, or otherwise in association with the digital image, such as in search results comprising the digital image. In some implementations, one or more of the captions are used as a title for the digital image. For example, each digital image in image entries 236 can have a corresponding title, which may be user defined.

As an overview, using network trainer 220, image ranker 206 is configured to train ranking network 250 to rank images against queries using multiple modalities, and/or using network manager 218 to implement the trained ranking network 250 to generate image rankings against queries using the multiple modalities. The images can correspond to the digital images contained in image entries 236, although it should be appreciated different images may be ranked than used to train ranking network 250.

Ranking network 250 is configured to receive network inputs comprising the images, text corresponding to the images (e.g., keywords 244 and caption 246), and queries against which the images are to be ranked by ranking network 250. The network inputs are prepared and/or determined by network input determiner 216. Ranking network 250 comprises at least one neural network to which it provides inputs corresponding to the text, images, and queries to produce output rankings of the images.

As used herein, the network inputs used to train the at least one neural network are referred to as training inputs and the images, text, and queries thereof are respectively referred to as training input images, training input text, and training input queries. Further, the output rankings are referred to herein as training output rankings.

Query interface 212 is configured to receive queries, such as those described above as being provided via user input to application 110, which may comprise a search bar or other search interface to receive the query from the user. Network input determiner 216 can provide the queries to network trainer 220 as network inputs used to train ranking network 250 and/or network manager 218 to use the network inputs to generate output rankings of the images. Results interface 222 can receive the output rankings from ranking network 250 and provide the ranked images and/or image rankings for presentation to users, such as in application 110.

In some implementations, when used to provide training inputs for training ranking network 250, network input determiner 216 determines the network inputs based on interaction data 232. Interaction data 232 corresponds to user interactions with images in association with queries. Based on detecting or determining an association between a query and a digital image based on interaction data 232, network input determiner 216 can provide the corresponding query, digital image, and text associated with the digital image to ranking network 250 as training inputs.

In various implementations, interaction data 232 corresponds to a user either clicking on an image in association with a query or refraining from clicking on the image in association with the query. In particular, interaction data 232 can be generated for image entries 240 based on presentation of corresponding digital images and/or image entries in association with one or more queries. In some cases, network input determiner 216 uses presented digital images clicked on or otherwise interacted with in association with a user and query as a positive sample for the query in training ranking network 250. Further, in some implementations, network input determiner 216 uses presented digital images a user refrained from clicking on or otherwise interacting with in association with a query as a negative sample for the query in training ranking network 250.

As an example of the forgoing, a user may submit a query to image ranker 206 using query interface 212. In response, results interface 222 may cause presentation of at least some of image entries 240 and/or digital images 242 to the user as search results (e.g., in application 110). The search results may, for example, be ranked against the query using ranking network 250 and/or some other ranking metric. Interaction data 232 can be generated based on whether or not the user interacts with those presented digital images. For example, each digital image the user clicks on (e.g., a click-through) or otherwise selects may be used as a positive sample for training ranking network 250 and one or more of the remaining images may each be used as a negative sample for the training.

In implementations where image ranker 206 determines training inputs for training ranking network 250 based on user interactions corresponding to interaction data 232, reliable training data can be provided without requiring manual labeling and curation. Further, in some cases, new training inputs may be acquired by image ranker 206 and used to improve the training of ranking network 250 through feedback given by users to the ranked results produced by ranking network 250 and presented using results interface 222. Thus, training of ranking network 250 could be ongoing. As mentioned above, ranking network 250 is configured to generate rankings of images against queries using multiple modalities. Each modality can correspond to a ranking of an image with respect to a query using a respective set of ranking criteria.

In various implementations, ranking network 250 aggregates the rankings for an image and query from each modality, resulting in a multi-modal ranking (e.g., output ranking) of the image against the query. Where ranking network 250 is being trained, the multi-modal ranking may be evaluated to adjust parameters of ranking network 250, as will later be described in further detail. Where ranking network 250 is being used to generate search results for a query, a multi-modal ranking may be generated for each digital image and/or image entry 240 against the query. Further the search results can correspond to the multi-modal rankings of the images. For example, results interface 222 can provide the images in search results which are presented and/or sorted based on their corresponding multi-modal rankings (e.g., the images and/or image entries may be presented in order of their multi-modal rankings).

As mentioned above, ranking network 250 includes at least one neural network. For example, in some implementations, one or more of the modalities of ranking network 250 uses a respect neural network to learn its corresponding set of criteria. For example, at least one neural network may learn how to rank visual features of an image against a query and at least one other neural network may learn how to rank language or textual features of the image against the query.

As mentioned above, each modality can be based on visual features and/or textual features of the image. For example, in some cases, one modality is based on only visual features of an image and another modality is based on only textual features of the image, such as language or semantic features of the image's metadata (e.g., captions and/or keywords).

In some embodiments, the image's metadata may include one or more tags associated with the image. The one or more tags may be derived from different tagging methods including auto-tagging techniques that do not require any user input. In certain embodiments, a tagging server may determine one or more tags for an image. Some embodiments may send the image to the tagging server and receive the tags determined by the tagging server. In some embodiments, the tags can identify objects within the image, and attributes of the objects (e.g., color, size) in the image.

In addition to or instead of using a neural network to learn a modality, ranking network 250 can use at least one neural network to learn relative importance weightings of the modalities in aggregating their corresponding rankings to generate a multi-modal ranking of images against queries. In implementations where the at least one neural network is provided with features from the modalities, the at least one neural network can further learn how the various features of images should impact their importance weightings in multi-modal rankings. For example, the at least one neural network may learn to weight language features higher than the visual features when the visual features are blurred or distorted. As another example, the at least one neural network may learn to weight visual features higher when the query is long or detailed or few keywords are available for an image.

Figure 3:
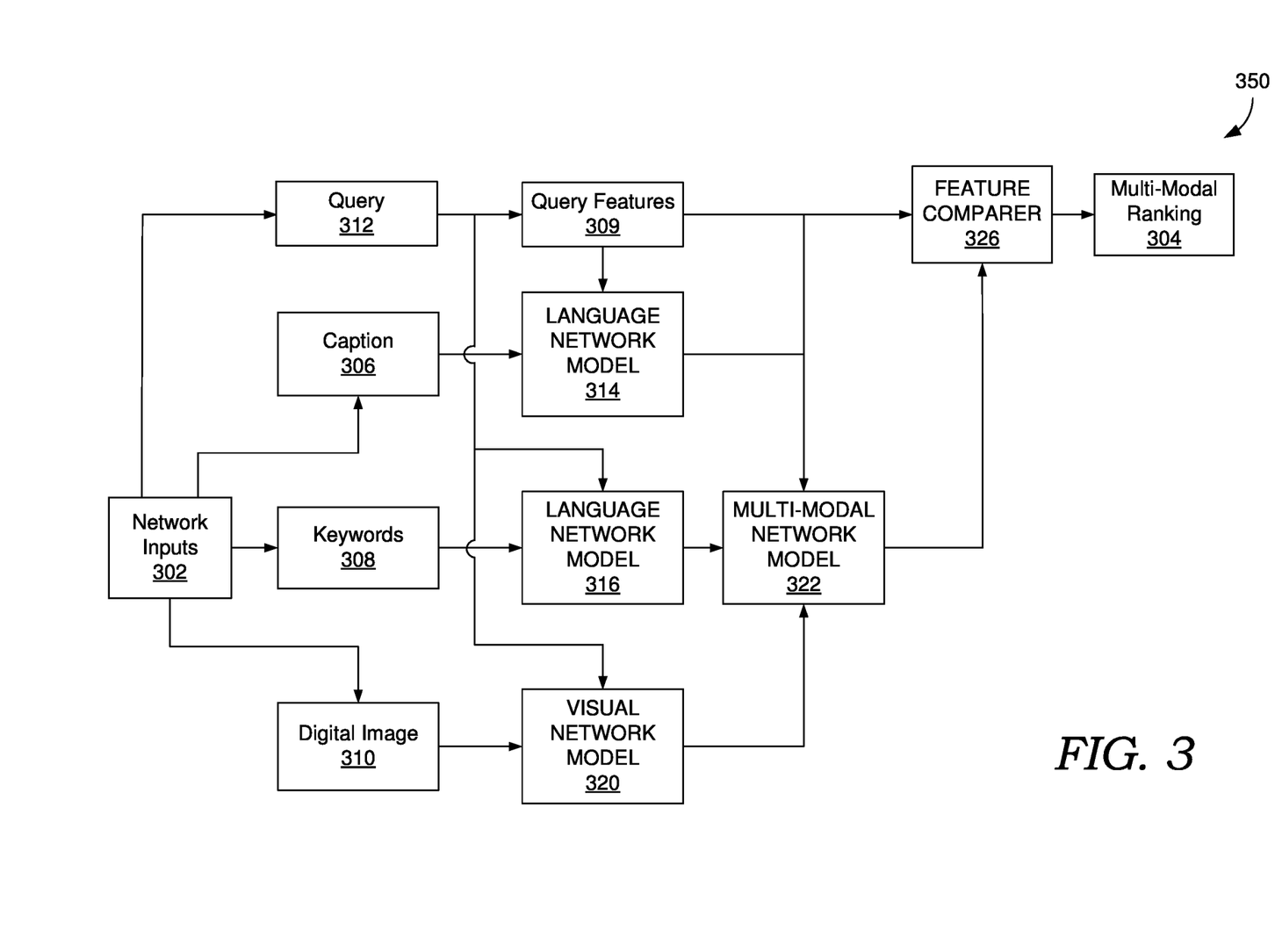
FIG. 3 shows a block diagram of a ranking network, in accordance with embodiments of the present disclosure.

FIG. 3 shows an example, of a ranking network in accordance with the present disclosure. Ranking network 350 can correspond to ranking network 250 of FIG. 2. As shown, ranking network 350 includes network inputs 302, which can correspond to the network inputs provided by network input determiner 216. Network inputs 302 represents a set of network inputs ranking network 350 uses to generate a corresponding multi-model ranking 304. In particular network inputs 302 can correspond to a digital image and/or image entry, such as one of image entries 236, and an associated query.

In some implementations, network inputs 302 includes a query, a digital image and text and/or metadata of the digital image. For example, network inputs 302 could include digital image 310 corresponding to digital image 242, keywords 308 corresponding to keywords 244, caption 306 corresponding to caption 246, as well as query 312 associated with digital image 310. Ranking network 350 comprises various network models (e.g., ranking means) configured to process network inputs 302 and generate visual rankings and text rankings from the inputs. For example, language network model 314 generates caption features from caption 306 of digital image 310, language network model 316 generates keyword features from keywords of digital image 310, and visual network model 320 generates visual features from digital image 310. Ranking network 350 also processes query 312 to generate query features 309. Query features 309 can be a single embedding vector derived from query 312, such as using Word2Vec to generate a vector for each word of the query and combining the vectors into the query embedding vector.

Each of language network model 314, language network model 316, and visual network model 320 embody a respective modality for ranking digital image 310 with respect to query 312. For each respective modality model, the ranking features (e.g., embeddings) generated from at least some of network inputs 302 are used as inputs to at least one neural network of the model, which can implement the respective modality of the model. A particular modality model may employ one or more neural networks, but may be referred to in singular for simplicity. These neural networks independently process input features, or embeddings, to generate respective output ranking features, or embeddings.

In particular, ranking network 350 includes two language network models 314 and 316 each embodying a respective language modality, which evaluates the text features associated with digital image 310 against query features 309 of query 312. Ranking network 350 also includes visual network model 320 embodying a visual modality, which evaluates the visual features of digital image 310 against query features 309 of query 312.

The visual features generated by visual network model 320 correspond to visual information defined by digital image 310, such as pixel information, chroma information, and/or luma information. The caption features generated by language network model 314 correspond to semantic and/or text features of caption 306 of digital image 310. Similarly the keyword features correspond to semantic and/or text features of keywords 308 of digital image 310. Further, query features 309 may optionally be applied to each model and correspond to semantic and/or text features of query 312.

It should be appreciated that language network model 314 is configured to evaluate captions of images with respect to queries while language network model 316 is configured to evaluate keywords of images with respect to queries. In other implementations, these both caption and keyword features may be applied to the same modality model or the features applied may correspond to a combination of caption 306 and keywords 308. However, it has been found that captions of images may describe images in a different manner than keywords, such that ranking network 350 learning their impact separately can improve image rank rankings. For example, captions often use natural language and sentences, which contain different words (e.g., conjunctions, articles, and prepositions are typically not used as keywords) and capture different semantic information than keywords.

In certain embodiments, keywords of an image can be identified by searching for comments posted on a social media platform where the comments are directed at the image. In some embodiments, the keywords can be specified by a user to be associated with the image.

The various modality models of ranking network 350 each output respective ranking features (e.g., embeddings) from their corresponding input features. As shown, ranking network 350 provides the ranking features from each modality model as respective input features to multi-modal network model 322 (e.g., a multi-modal weighting means), along with query features 309. Multi-modal network model 322 is configured to aggregate the ranking features (or rankings) produced using each modality model to generate multi-modal ranking features (e.g., embeddings). In the implementation shown, this includes at least one neural network which learns relative importance weightings for the ranking features from each modality based on query features 309.

Multi-modal network model 322 can be implemented, for example, using an intra-attention neural network. The intra-attention neural network learns how to weigh various ranking features from each modality model against the query. Thus, multi-modal network model 322 can learn which modalities are useful to focus on for different queries. In some implementations, multi-modal network model 322 comprises a non-linear similarity layer which learns to produce different importance weighting scores for each modality model (e.g., a caption weighting score, a keywords weighting score, and a visual weighting score). These importance weighting scores reflect the learned importance of corresponding modality models for a given input query. Multi-modal network model 322 can reweight the ranking features of each modality model using its corresponding weight score and combine (e.g., average) the reweighted modality ranking features to generate multi-modal ranking features (e.g., embeddings). One example of multi-modal network model 322 will later be described in additional detail with respect to FIG. 4C.

Feature comparer 326 (e.g., a combiner means) generates multi-modal ranking 304 for network inputs 302 based on a comparison between the multi-modal ranking features from multi-modal network model 322 and query 312. In various implementations, the more similar the multi-modal ranking features are to query 312, the higher multi-modal ranking 304 will be. In various implementations, the comparison comprises a cosine similarity between query 312 and the multi-modal ranking features.

As indicated above, the neural networks of language network model 314, language network model 316, visual network model 320, and multi-modal network model 322 can be jointly trained end-to-end. In other words, the neural networks thereof can be trained concurrently using a common input sample (e.g., network inputs 302). The training may be accomplished, for example, using positive samples and optionally negative samples, such as has been described above. In training the neural networks, network trainer 220 may calculate the loss function for prediction based on the sample used as an input to ranking network 350, which resulted in the multi-modal ranking. Network trainer 220 can back-propagate the calculated loss to each neural network using a stochastic gradient descent method. In implementations where both positive and negative samples are employed, the loss can be determined using binary-classification where the ground truth for a positive sample is set to 1 and for a negative sample is set to 0. In some implementations, network input determiner 216 determines the network inputs used to train the ranking network based on a predefined positive sample to negative sample ratio for a given query. As an example, three or at most three negative samples may be used for each positive sample for a query.

In some implementations, network manager 218 is configured to determine whether ranking network 250 is sufficiently trained. This determination could be based on applying one or more multi-modal rankings to the loss function, as an example. Based on this determination, network manager 218 may utilize ranking network 250 to process a query against digital images to generate search results and result the search results, such as using results interface 222 (e.g., a results interface means). As indicated above, ranking network 250 may be continuously trained based on user interactions with search results generated using ranking network 250.

Figure 4A:
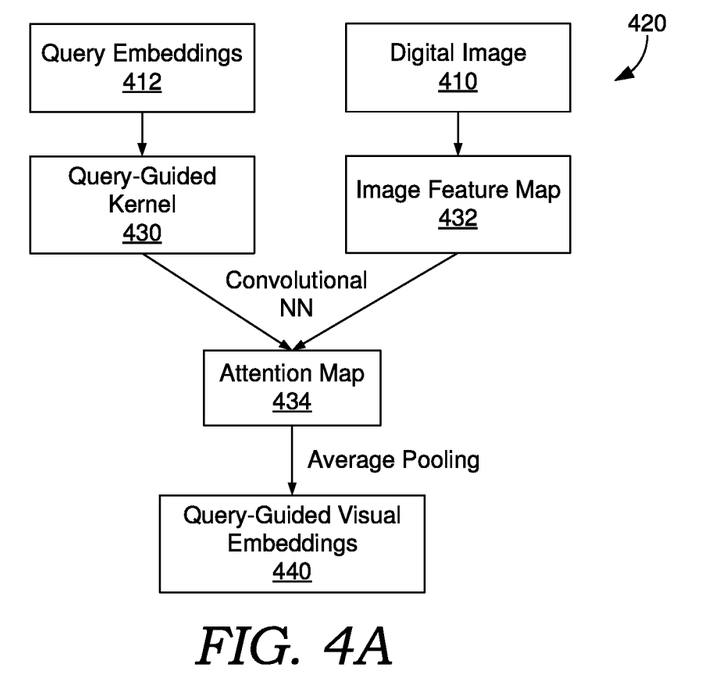
FIG. 4A shows an example of a visual network model, in accordance with embodiments of the present disclosure.

FIG. 4A illustrates an example of a visual network model in accordance with disclosed embodiments. In particular, FIG. 4A illustrates visual network model 420 which can correspond to visual network model 320 of FIG. 3. Visual network model 420 is an intra-attention model which learns to focus on useful regions of an image for a given query. Visual network model 420 transforms query embeddings 412, which can correspond to query 312 of FIG. 3 into query-guided kernel 430 (e.g., a query-guided convolutional kernel). Visual network model 420 further transforms digital image 410, which can correspond to digital image 310 of FIG. 3 into image feature map 432. To do so, visual network model 420 may use a pre-trained ResNet which outputs image feature map 432. The neural network of visual network model 420 convolves query-guided kernel 430 with image feature map 432 to result in attention map 434. For example, a convolutional neural network can receive, as inputs, query-guided kernel 430 and image feature map 432, and output attention map 434. An average-pooling layer generates query-guided visual embeddings 440 (e.g., an embedding vector) from attention map 434.

Using visual network model 420, for example, visual network model 420 can learn to focus query-guided visual embeddings 440 on regions of a person's clothes over other regions in digital image 410 where the query is "person red clothes." Where the query is instead "person in black shoes," query-guided visual embeddings 440 may instead focus on regions of a person's black shoes over other regions in digital image 410. In some implementations, the regions represent at least a 3×3 map of the digital image (e.g., a 300×300 image includes three 100×100 regions). However, more regions could be employed. Further, visual network model 420 is but one example of a modality based on visual features of a digital image. Any number of visual modalities may be employed in various implementations.

Figure 4B:
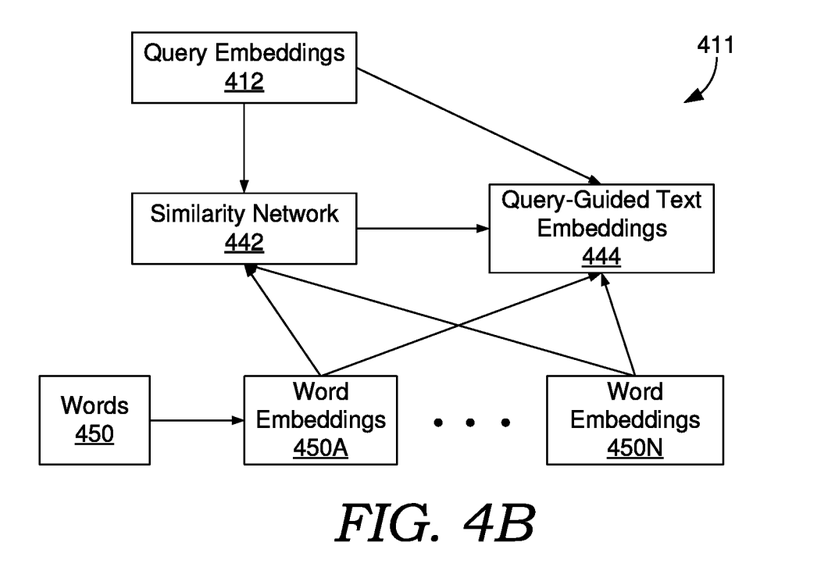
FIG. 4B shows an example of a language network model, in accordance with embodiments of the present disclosure.

FIG. 4B illustrates an example of a language network model in accordance with disclosed embodiments. In particular, FIG. 4A illustrates language network model 411. Language network models 314 and/or 316 of FIG. 3 may be implemented as respective instances of language network model 411, or a different model may be used for each modality. Language network model 411 is an intra-attention model which learns to focus on useful ones of words 450 for a given query. For example, when query 312 is "man with a dog," language network model 411 can focus on the words "man," and "dog" in captions (e.g., titles) and keywords of images. When query 312 is "sunny beach," more importance may be given to words like "sunshine," "shoreline," and "ocean." For caption language network model 314, words 450 may be of caption 306, whereas for language network model 316, words 450 may be of keywords 308. However, as indicated above, caption 306 and keywords 308 could be applied to the same modality model. Thus, words 450 could correspond to both caption 306 and keywords 308 in some implementations.

Language network model 411 is configured to transform each of words 450 into its word features or word embedding vectors, depicted as word embeddings 450A through 450N (or word features). This can be accomplished, for example, using Word2Vec which captures the linguistic context of words in vector form (e.g., semantic and syntactic relationships between words). In some implementations, word features for keywords are determined using a keyword dictionary and word features for captions are determined using a different caption dictionary. Language network model 411 uses similarity network 442 to learn similarities between query embeddings 412 (e.g., a query embedding vector) and each of word embeddings 450A through 450N. Similarity network 442 may comprise a non-linear similarity layer. The learned similarities are used as weights to do weighted-averaging over all word embeddings 450A through 450N, resulting in an output of query-guided text embeddings 444 or query-guided text features.

Figure 4C:
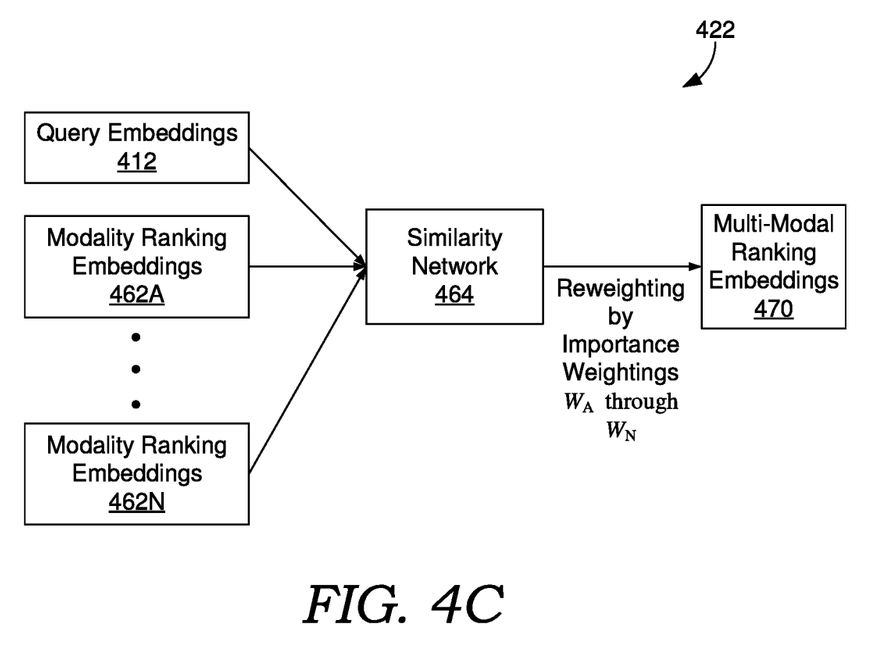
FIG. 4C shows an example of a multi-modal network model, in accordance with embodiments of the present disclosure.

FIG. 4C illustrates an example of a multi-modal network model in accordance with disclosed embodiments. In particular, FIG. 4C illustrates multi-modal network model 422, which can correspond to multi-modal network model 322 of FIG. 3. Multi-modal network model 422 is an inter-attention model which learns to focus on useful modalities for a given query. Each modality may correspond to respective modality ranking embeddings, of which modality ranking embeddings 462A through 462N are shown in FIG. 4C. For example, one set of modality ranking embeddings may be query-guided visual embeddings 440. Another set of modality ranking embeddings may be query-guided text embeddings 444. It should be appreciated that different query-guided text embeddings 444 could be used for a caption of the image and keywords of the image where they are evaluated in separate modalities, as described above.

The various modality ranking embeddings, or features, are provided as respective inputs to similarity network 464 which learns similarities between query embeddings 412 (e.g., a query embedding vector) and each of modality ranking embeddings 462A through 462N. Similarity network 464 may comprise a non-linear similarity layer of a neural network. The learned similarities are used as importance weights to reweight each set of modality ranking embeddings by their corresponding importance weight. The reweighted modality ranking embeddings are combined by multi-modal network model 422 to form multi-modal ranking embeddings 470. For example, multi-modal ranking embeddings 470 may be an average of the reweighted modality ranking embeddings. Multi-modal ranking embeddings 470 may be provided to feature comparer 326, as indicated in FIG. 3.

Figure 5:
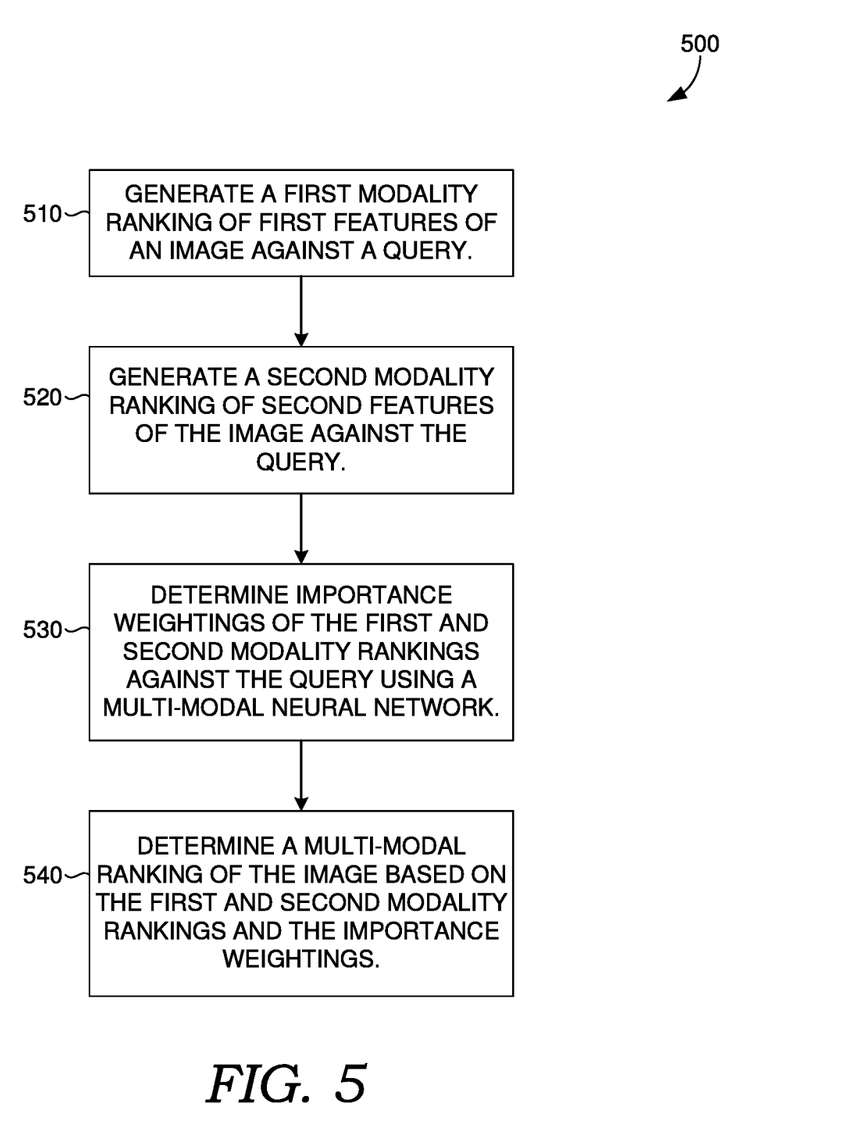
FIG. 5 is a flow diagram showing a method for ranking images against queries, in accordance with embodiments of the present disclosure.

Referring now to FIG. 5, a flow diagram is provided showing an embodiment of a method 500 for ranking images based on queries. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes generating a first modality ranking of first features of an image against a query. For example, query interface 212 may receive a query submitted by a user to a search interface via application 110. In response to receiving the query, method 500 may be performed for each of image entries 236. For example, network input determiner 216 may determine network inputs 302 comprising query 312, caption 306, keywords 308, and digital image 310, and network manager 218 may provide network inputs 302 to ranking network 350 (e.g., in response to receiving the query). Further, ranking network 350 may generate query-guided visual embeddings from query embeddings 412 and digital image 410 using visual network model 420.

At block 520, method 500 includes generating a second modality ranking of second features of the image against the query. For example, ranking network 350 may generate query-guided text embeddings from query embeddings 412 and words 450 for at least one instance of language network model 411.

At block 530, method 500 includes determining importance weightings of the first and second modality rankings against the query using a multi-modal neural network. For example, ranking network 350 may multi-modal ranking embeddings 470 from query embeddings 412, and modality Ranking Embeddings 462A through 462N.

At block 540, method 500 includes determining a multi-modal ranking of the image based on the first and second modality rankings and the importance weightings. For example, ranking network 350 can provide multi-modal ranking embeddings 470 and query features 309 (e.g., query embeddings 412) to feature comparer 326, which generates multi-modal ranking 304 of digital image 310 against query 312.

Image ranker 206 may generate search results comprising at least some of the digital images based on multi-modal ranking 304 of each digital image ranked against query 312. Image ranker 206 may use results interface 222 to cause the ranked digital images and/or image entries to be presented according to their multi-modal ranking, such as from highest to lowest, in a search interface (e.g., higher ranked images at the top of a search results page).

Figure 6:
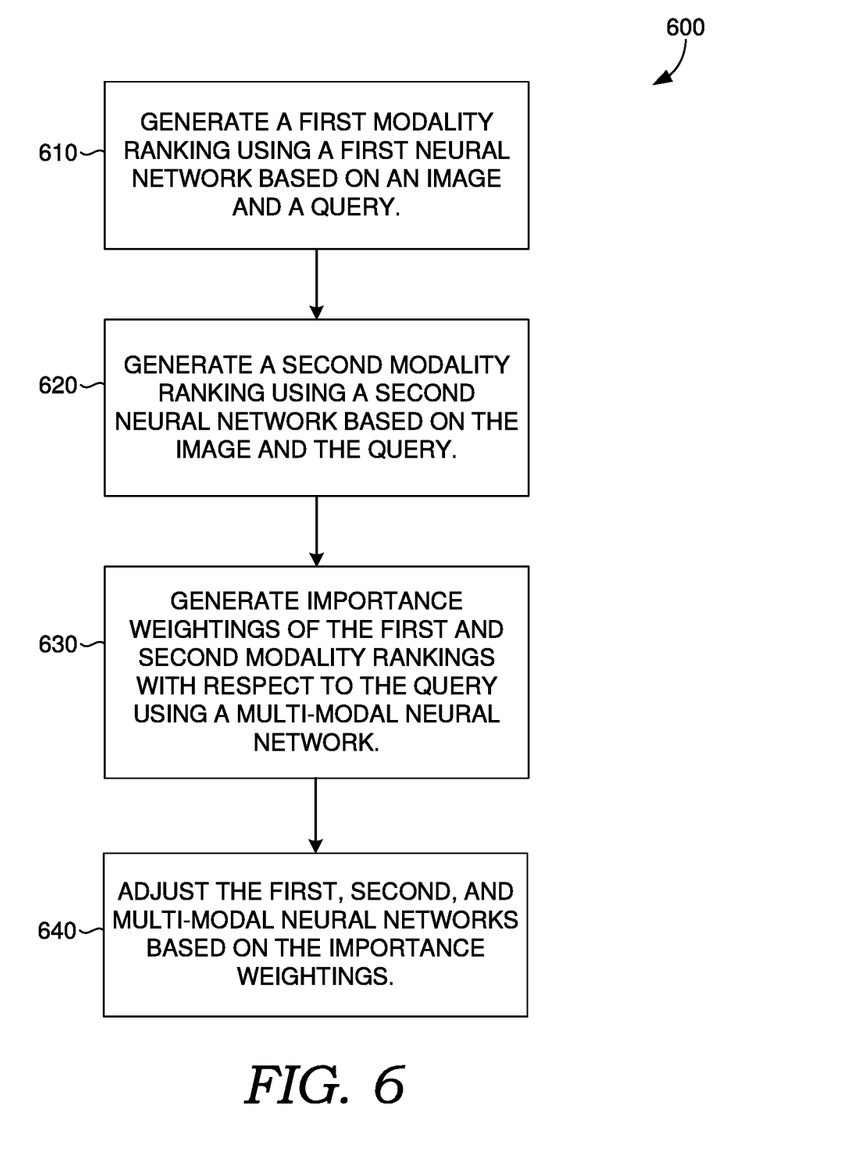
FIG. 6 is a flow diagram showing another method for ranking images against queries, in accordance with embodiments of the present disclosure.

With reference to FIG. 6, a flow diagram is provided showing an embodiment of a method 600 for training a ranking network to rank images against queries.

At block 610, method 600 includes generating a first modality ranking using a first neural network based on an image and a query. For example, language network model 411 can generate query-guided text embeddings 444 based on words 450 associated with digital image 410 and query embeddings 412 (e.g., using similarity network 442).

At block 620, method 600 includes generating a second modality ranking using a second neural network based on an image and the query. For example, visual network model 420 can generate query-guided visual embeddings 440 based on image feature map 432 and query embeddings 412 (e.g., using at least one convolutional layer). In some embodiments, the first neural network is different from the second neural network (e.g., a different architecture). In certain embodiments, the first neural network is the same as the second neural network.

At block 630, method 600 includes generating importance weightings of the first and second modality rankings with respect to the query using a multi-modal neural network. For example, multi-modal network model 422 can generate importance weightings $W_A$ through $W_N$ of modality ranking embeddings 462A through 462N with respect to query embeddings 412 using similarity network 464.

At block 640, method 600 includes adjusting the first, second, and multi-modal neural networks based on the importance weightings. For example, network trainer 220 can adjust parameters of the neural networks of visual network model 420, language network model 411, and multi-modal network model 422 based on multi-modal ranking embeddings 470, such as using multi-modal ranking 304. Each neural network may be independent from one another, but trained jointly. For example, the layers of the neural networks may be independent from one another.

Figure 7:
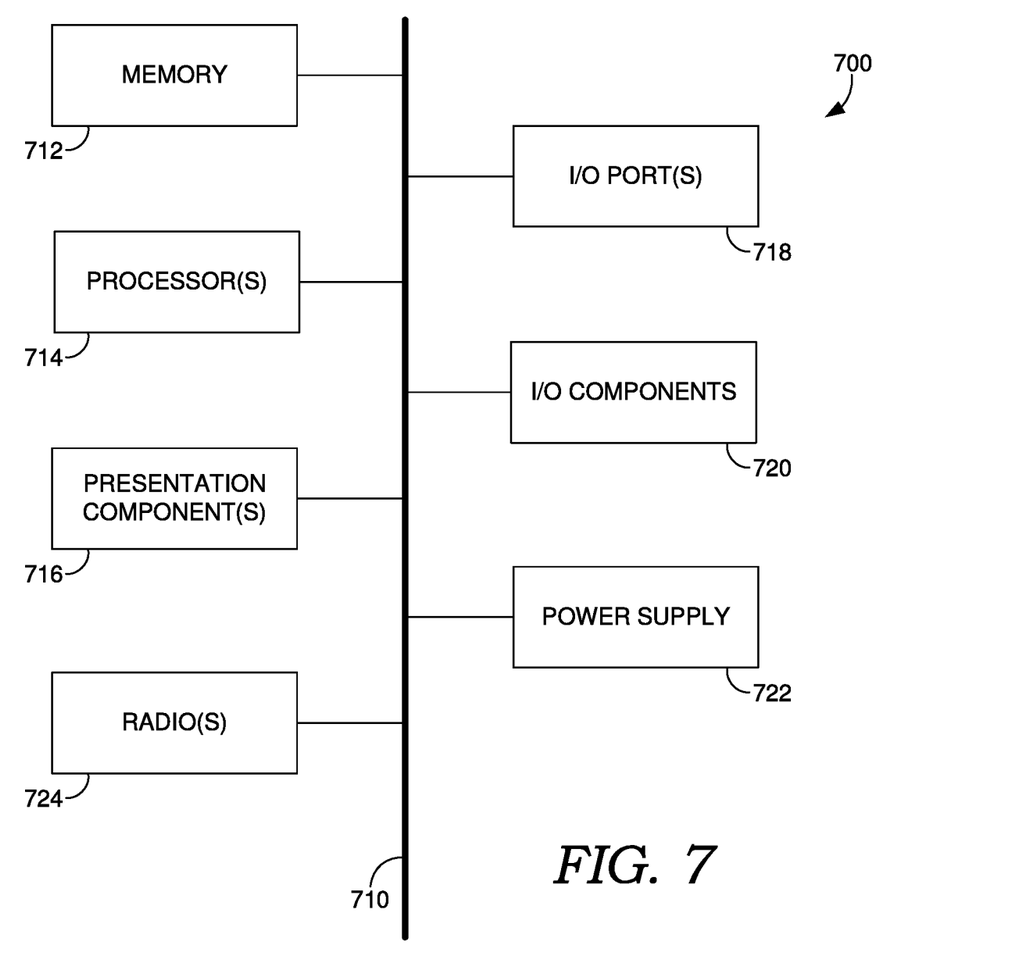
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700.

Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for ranking images against queries, the method comprising:
   generating a visual modality ranking comparing an embedding of at least one visual feature of a digital image to an embedding of a textual query;
   generating a language modality ranking comparing an embedding of at least one text feature of text associated with the digital image to the embedding of the textual query;
   determining, by a multi-modal neural network, importance weightings of the language modality ranking and the visual modality ranking against the textual query;
   combining, by one or more processors, the visual modality ranking and the language modality ranking into a multi-modal ranking of the digital image against the textual query based on the importance weightings; and
   providing the digital image as a search result of the textual query based on the multi-modal ranking.

2. The computer-implemented method of claim 1, wherein the visual modality ranking is generated from a first neural network, and the language modality ranking is generated from a second neural network.

3. The computer-implemented method of claim 1, wherein the combining weights the visual modality ranking by a first importance weighting generated by the multi-modal neural network, and the language modality ranking by a second importance weighting generated by the multi-modal neural network.

4. The computer-implemented method of claim 1, wherein the at least one visual feature comprises a plurality of visual features respectively representing regions of the digital image, and the generating comprises an intra-attention neural network generating a separate importance weighting quantifying importance of each of the regions relative to the textual query.

5. The computer-implemented method of claim 1, wherein the at least one text feature comprises a plurality of text features respectively representing words associated with the digital image, and generating the language modality ranking comprises generating, using an intra-attention neural network, a separate importance weighting quantifying importance of each of the words against the textual query.

6. The computer-implemented method of claim 1, wherein the text features correspond to at least one of a caption of the digital image and one or more keywords of the digital image.

7. The computer-implemented method of claim 1, further comprising generating a caption modality ranking of caption features of a caption of the digital image against the textual query, wherein the importance weightings comprise an importance weighting quantifying importance of the caption modality ranking and a separate importance weighting quantifying importance of the language modality ranking, and wherein the multi-modal ranking is combined from the caption modality ranking in addition to the visual modality ranking and the language modality ranking.

8. The computer-implemented method of claim 1, further comprising generating a keyword modality ranking of at least one keyword feature of one or more keywords of the digital image against the textual query, wherein the importance weightings comprise an importance weighting of the keyword modality ranking and a separate importance weighting of the language modality ranking, and wherein the combing is of the visual modality ranking, the language modality ranking, and the keyword modality ranking into the multi-modal ranking.

9. The computer-implemented method of claim 1, wherein the combining the visual modality ranking and the language modality ranking into the multi-modal ranking comprises comparing multi-modal ranking embeddings representing the visual modality ranking and the language modality ranking reweighted by the importance scores to query embeddings representing the textual query.

10. One or more computer-readable media having executable instructions embodied thereon, which, when executed by one or more processors, cause the one or more processors to perform a method for ranking images against queries, the method comprising:
generating a first modality ranking comparing an embedding of first features corresponding to a digital image to an embedding of a textual query;
generating a second modality ranking comparing an embedding of second features corresponding to the digital image to the embedding of the textual query;
determining, by a multi-modal neural network, importance weightings of the first modality ranking and the second modality ranking against the textual query;
combining the first modality ranking and the second modality ranking into a multi-modal ranking of the digital image against the textual query based on the importance weightings; and training the multi-modal neural network based on the multi-modal ranking of the digital image.

11. The one or more computer-readable media of claim 10, wherein the training uses the digital image as a positive sample based on user interaction data indicating a user interaction with the digital image amongst a plurality of digital images presented on a user device.

12. The one or more computer-readable media of claim 10, wherein the training uses the digital image as a negative sample based on user interaction data indicating an absence of user interaction with the digital image amongst a plurality of digital images presented on a user device.

13. The one or more computer-readable media of claim 10, wherein the first modality ranking is of caption features of a caption of the digital image against the textual query, and the second modality ranking is of keyword features of one or more keywords of the digital image against the textual query.

14. The one or more computer-readable media of claim 10, wherein the first modality ranking and the second modality ranking are generated by separate neural networks, and the training is of the separate neural networks and the multi-modal neural network based on the multi-modal ranking.

15. The one or more computer-readable media of claim 10, further comprising determining search results of a second textual query using the trained multi-modal neural network.

16. A computer-implemented system for ranking images against queries, the system comprising:
one or more hardware processors and memory configured to provide computer program instructions to the one or more hardware processors;
a first ranking means for generating, by the one or more hardware processors, a first modality ranking comparing embeddings of first features corresponding to a digital image to an embedding of a textual query;
a second ranking means for generating, by the one or more hardware processors, a second modality ranking comparing embeddings of second features corresponding to the digital image to the embedding of the textual query;
a multi-modal weighting means for determining, by the one or more hardware processors, importance weightings of the first modality ranking and the second modality ranking against the textual query;
a combiner means for combining, by the one or more hardware processors, the first modality ranking and the second modality ranking into a multi-modal ranking of the digital image against the textual query based on the importance weightings; and
results interface configured to provide the digital image as a search result of the textual query based on the multi-modal ranking.

17. The computer-implemented system of claim 15, further comprising a network trainer means for adjusting, by the one or more hardware processors, the first ranking means, the second ranking means, and the multi-modal weighting means based on the multi-modal ranking.

18. The computer-implemented system of claim 15, wherein the first ranking means is a visual modality ranking means and the second ranking means is a language modality ranking means.

19. The computer-implemented system of claim 15, wherein the multi-modal weighting means comprises a multi-modal neural network to determine the importance weightings.

20. The computer-implemented system of claim 15, wherein the first ranking means comprises a first neural network to determine the first modality ranking and the second ranking means comprises a second neural network to determine the second modality ranking.

\* \* \* \* \*

UNITED STATES PATENT AND TRADEMARK OFFICE
CERTIFICATE OF CORRECTION

PATENT NO. : 10,642,887 B2  
APPLICATION NO. : 15/391285  
DATED : May 5, 2020  
INVENTOR(S) : Kan Chen et al.

Page 1 of 1

It is certified that error appears in the above-identified patent and that said Letters Patent is hereby corrected as shown below:

In the Claims

In Column 18, Line 55, Claim 17, delete "claim 15," and insert -- claim 16, --, therefor.

In Column 18, Line 60, Claim 18, delete "claim 15," and insert -- claim 16, --, therefor.

In Column 18, Line 64, Claim 19, delete "claim 15," and insert -- claim 16, --, therefor.

In Column 19, Line 1, Claim 20, delete "claim 15," and insert -- claim 16, --, therefor.

Signed and Sealed this  
Twenty-third Day of June, 2020

Andrei Iancu  
*Director of the United States Patent and Trademark Office*